UNITED STATES PATENT OFFICE.

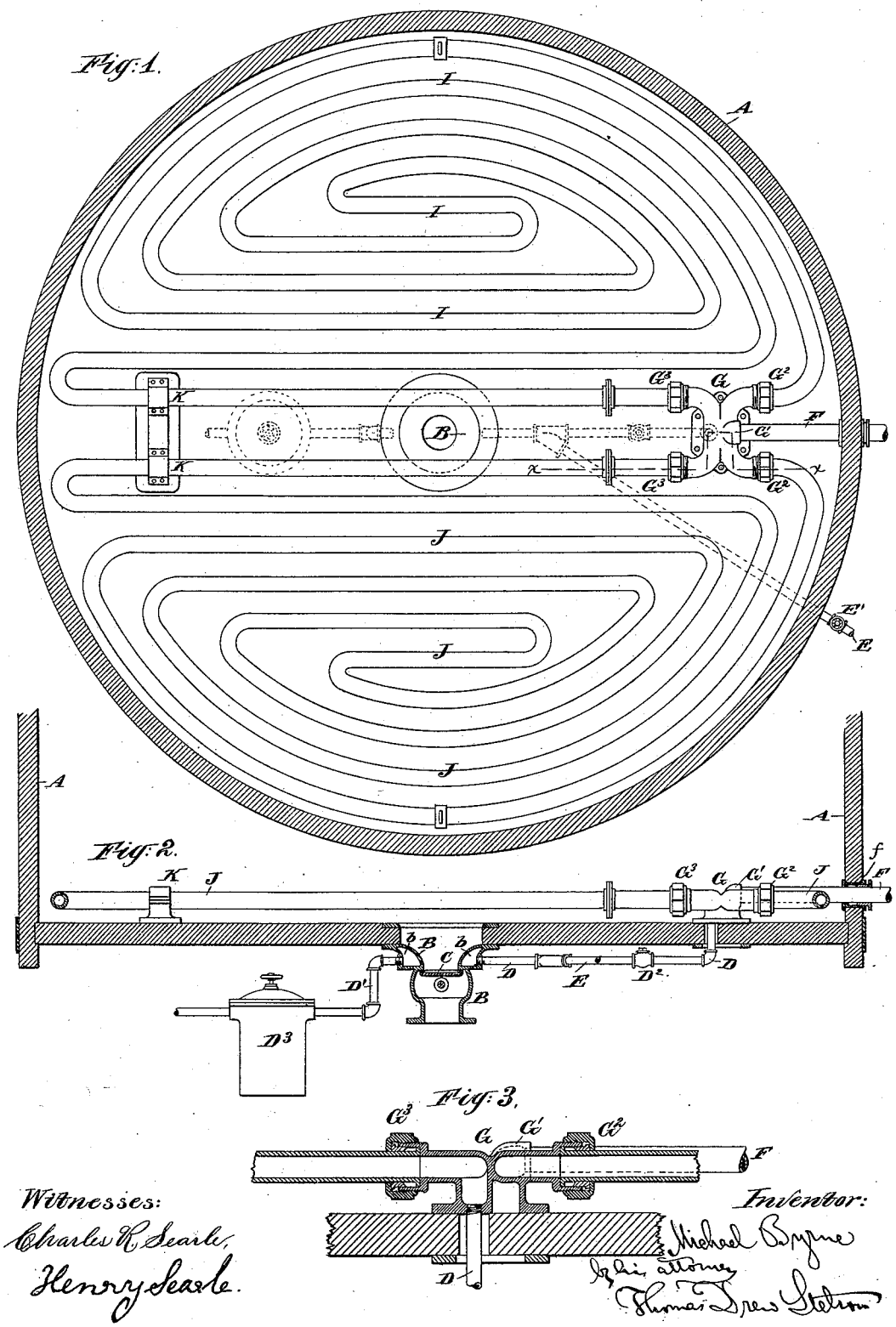

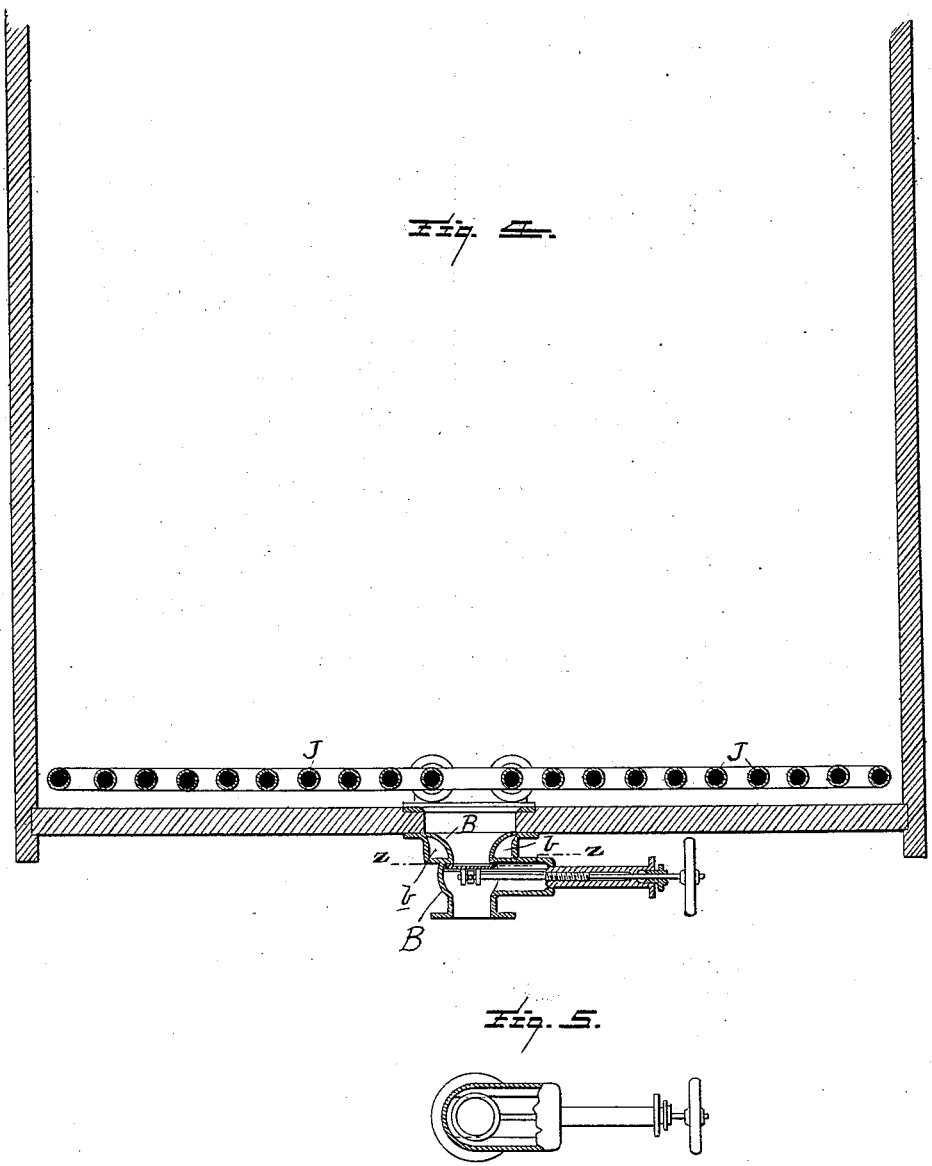

MICHAEL BYRNE, OF NEW YORK, N. Y.

STEAM BOILING APPARATUS.

SPECIFICATION forming part of Letters Patent No. 416,563, dated December 3, 1889.

Application filed September 14, 1888. Serial No. 285,408. (No model.)

*To all whom it may concern:*

Be it known that I, MICHAEL BYRNE, of the city and county of New York, in the State of New York, have invented a certain new and useful Improvement in Steam Boiling Apparatus, of which the following is a specification.

The improved apparatus is intended more especially for boiling liquids in large quantities, as required, at certain stages in the manufacture of beer. It will be described as thus used; but it may be understood that it can be used with advantage in apparatus for boiling other liquids.

My invention overcomes a difficulty heretofore experienced in boiling in the ordinary long-approved wooden or metal tanks by steam heating-coils lying in a horizontal position near the bottom. The difficulty is found in the unequal boiling of different portions of the beer due to the tardiness with which that lying below the coils commences to be treated. The coils ordinarily raise the temperature quite rapidly of the beer in immediate contact with them, and this is displaced by other beer lying above and the circulation commences and continues, the temperature rapidly rising until all the beer at the level of the coils and above is raised to the boiling temperature; but during all this stage the beer below the coils is liable to lie undisturbed. At a later stage, when the ebullition becomes active, the violence of the currents is sufficient to partially agitate the previously-quiet stratum below and cause it to mingle with the rest. The result is to boil the beer unequally, the main portion having been boiled the required period, or perhaps a little in excess thereof, while another portion—that originally lying below the coils—has been boiled only three-quarters or some other fraction of the proper time.

I provide for raising the temperature at one or more points in the extreme bottom. The beer rises from that point or those points. The cold beer lying adjacent to the bottom is drawn toward the spot and in turn warmed, and thus the whole is early carried up and subjected to the influence of the more efficient heating-coils above.

In what I consider the most complete form of the invention I use the hot water of condensation discharged from the coils to effect the low degree of warming required to induce such circulation in the extreme bottom. I have also introduced important improvements in the details, as will appear farther on.

The accompanying drawings form a part of this specification, and represent what I consider the best means of carrying out the invention.

Figure 1 is a horizontal section, and Fig. 2 is a vertical section, showing the entire lower portion of a tub with my apparatus. Fig. 3 is a vertical section of a portion on a larger scale. It is a section of the line $x$ $x$ in Fig. 1. Fig. 4 is a vertical section of a portion at right angles to the section in Fig. 2. Fig. 5 is a horizontal section on the line $z$ $z$ in Fig. 4.

Similar letters of reference indicate corresponding parts in all the figures where they occur.

A is a wooden tank or tub, which may conform in all respects to the usual construction, except that the orifice in the bottom through which the beer is to be discharged is larger than usual.

B is a casting, forming a discharge-nozzle presenting a considerably-inverted conoidal surface to the beer in its interior. A common gate-valve C, of the ordinary construction and operated horizontally at will by the ordinary hand-wheel and screw, (not shown,) permits the beer to be discharged through the nozzle B, or to be retained, as required. A chamber $b$ is cored in this casting B, extending quite around the same. An induction-pipe D connects with this chamber on one side, and an eduction or discharge pipe D' connects therewith on the opposite side. Fluid, which may be hot water or steam, flowing in through D circulates through the chamber and is discharged through D'.

G is a hollow casting, certain portions of which will be designated, when necessary, by super-numerals, as G'. It is firmly bolted upon the bottom of the interior of A, near one side.

G' is a nozzle, which receives steam at the required high pressure, which comes from a boiler (not represented) through a pipe F, which is led through the side of the tank, the joint being formed by a stuffing-box $f$, which allows for the endwise motion due to expansion and contraction.

$G^2$ $G^2$ $G^3$ $G^3$ are stuffing-boxes, which engage, as shown, with the two halves I J of an ordinary heating-coil, each half of which is arranged to turn on the bearings formed by these stuffing-boxes and by proper cylindrical supports in the blocks K, mounted near the other side of the interior of the tank or tub. These heating-coils are of the style known as "butterfly," adapted to lie in the horizontal position for use, and to be turned up into the vertical position, when required, to facilitate cleaning.

The stuffing-boxes $G^2$ deliver steam to their respective coils. The stuffing-boxes $G^3$ receive steam, mingled largely with the water of condensation, from their respective coils. This portion of the casting G is separated from the portion $G^2$ by a strong partition. The pipe D is connected by an elbow and upright length to the lowest part of the hollow interior of G, being in communication with the stuffing-boxes $G^3$. The live steam received through F traverses the circuitous routes provided by the coils I J, and is discharged in the form of hot water and steam at a somewhat lower pressure through the pipe D. The beer lying on the bottom of the tank and presented to the interior of the discharge-nozzle B is at a lower temperature than that which is subject to the action of the large amount of heating-surface in the coils I J above. The water flowing from the coils at the temperature of the latter possesses still sufficient heat to efficiently contribute to warming the nozzle and the cooler beer lying in contact therewith. The small quantity of steam allowed to escape with the water is also utilized in warming the beer at this point. The water and escaping steam are finally discharged through the pipe D and an adjusted valve or a steam-trap $D^3$. The small quantity of beer in the nozzle B is warmed by the flow of hot fluid through the chamber $b$ and rises and mingles with the beer in the upper portion of the tub, and its place is supplied by fresh cold beer from the space around it at the bottom. The arrangement causes the whole contents of the tub or tank to be heated about equally and to commence to boil almost simultaneously.

E is a pipe joining the pipe D at an angle, as shown, and provided with a stop-valve E'. This pipe also receives steam from the boiler or boilers, (not shown,) and when the valve E' is opened supplies fresh steam to increase the heat in the chamber $b$, whenever such increase is desirable. A check-valve $D^2$ in the pipe D closes whenever the pipe E supplies steam to the chamber $b$ above the pressure at which the water and spent steam is discharged from the coils, and allows the heating of the chamber $b$ to be effected for a time by live steam alone. The arrangement allows the operator to work by the exhaust-steam and water alone by closing the valve E', or by both these, and the live steam by opening the valve E' a little, or by live steam alone, for a brief period, by opening the valve E' widely and causing the check-valve $D^2$ to be closed by the back-pressure.

One or the other mode of working may be adopted at any time, according as the conditions may demand.

Modifications may be made without departing from the principle or sacrificing the advantages of the invention. The heating-chamber may extend only partially around the nozzle. Such would cause only one side to serve as a heating-surface, and the apparatus would be less efficient; but it will be understood that the value of the invention does not in any great degree lie in the mere increase which is made thereby to the total heating-surface of the apparatus. It is sufficient that by warming a small portion of the cold stratum lying in the bottom it insures its early mingling with the rest of the beer in the tank and the consequent uniform boiling of the whole.

I claim as my invention—

1. In a steam boiling apparatus having a tank A and heating-coils I J, arranged above the bottom thereof, a chambered casting B $b$, with connections for leading the heating-fluid into the chamber $b$ thereof, and a valve C, mounted in such casting, combined, as shown, so as to perform the double function of aiding to circulate the beer in the tank and of discharging the beer when required, as herein specified.

2. The combination of a tank A, heating-coils I J, and provisions for supplying live steam and conveying away the spent steam and the condensed water, with a discharge-nozzle B, having an annular chamber $b$ in contact with the beer in the bottom of the tank A, and the connection leading from the heating-coils I J to the said chamber $b$ and thence away, arranged, as shown, so as to effect the warming of the chamber $b$ and of the beer adjacent thereto by the heat in the spent fluid, as herein specified.

3. In a steam heating apparatus having a tank with heating-coils, and a chamber $b$, arranged to induce circulation in the liquid at the bottom, the provisions for supplying the chamber at will with live steam through the separate pipe E and controlling-valve E', in combination with the pipe D, conducting the condensed water and spent steam from the coils to the chamber, so that either can be used alone or both together, as herein specified.

4. In a steam boiling apparatus, the casting B, chambered, as indicated by $b$, in combination with the tank A, containing heating-coils, and with the valve C, operated, as shown, arranged to perform the double function of a discharge-valve, and means for heating a portion only of the bottom of the tank and thereby circulating the beer lying there, as herein specified.

In testimony whereof I have hereunto set my hand, at New York city, in the presence of two subscribing witnesses.

MICHAEL BYRNE.

Witnesses:
THOMAS DREW STETSON,
CHARLES R. SEARLE.